United States Patent [19]

Bojanowski et al.

[11] Patent Number: 4,850,444
[45] Date of Patent: Jul. 25, 1989

[54] HOOD LOUVER DRAIN PAN AND SCREEN

[75] Inventors: Gerald M. Bojanowski, Mt. Clemens; David W. Smith, Sterling Heights, both of Mich.

[73] Assignee: General Motors Corporation, Detroit, Mich.

[21] Appl. No.: 276,001

[22] Filed: Nov. 25, 1988

[51] Int. Cl.⁴ ............................................. B60K 11/00
[52] U.S. Cl. .................... 180/68.1; 180/69.2
[58] Field of Search .................. 98/2, 2.17, 121.1; 123/41.56, 41.7; 180/68.1, 68.2, 69.2

[56] References Cited

U.S. PATENT DOCUMENTS

| | | | |
|---|---|---|---|
| 2,913,065 | 11/1959 | Lyon, Jr. ............................. | 180/68.1 |
| 2,969,807 | 1/1961 | Komenda et al. ................. | 180/68.1 |
| 2,972,340 | 2/1961 | Bertsch ............................. | 123/41.7 |
| 4,249,626 | 2/1981 | Fields et al. ...................... | 180/68.1 |
| 4,610,326 | 9/1986 | Kirchweger et al. ............. | 180/68.1 |

FOREIGN PATENT DOCUMENTS 2103200 7/1972 Fed. Rep. of Germany ..... 180/68.1

*Primary Examiner*—Harold Joyce
*Attorney, Agent, or Firm*—William A. Schuetz

[57] ABSTRACT

A vehicle hood mounted air extractor assembly for extracting air from an engine compartment. The air extractor assembly includes a louver mounted to the hood and a one piece molded plastic drain pan and screen which are integrally connected together via living hinges at one side thereof, foldable at the hinges to position the drain pan beneath the screen, then snap fittingly connected together at their other sides and then readily connected to the underside of the hood louver.

5 Claims, 3 Drawing Sheets

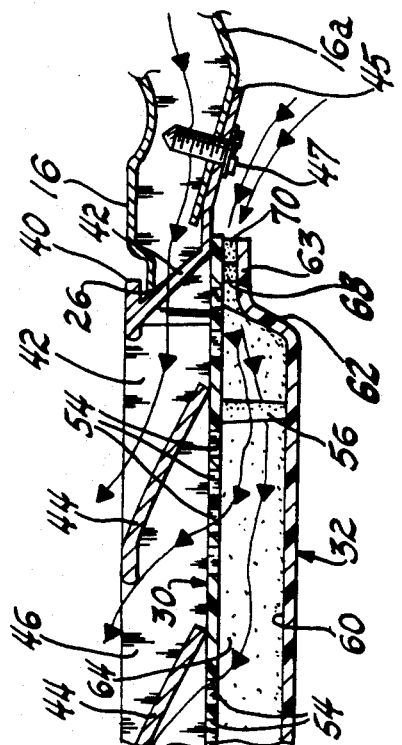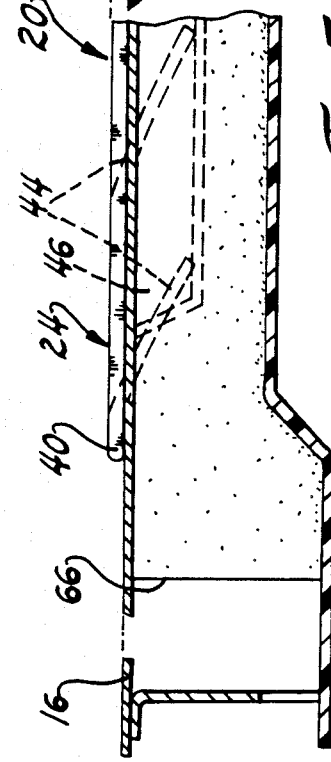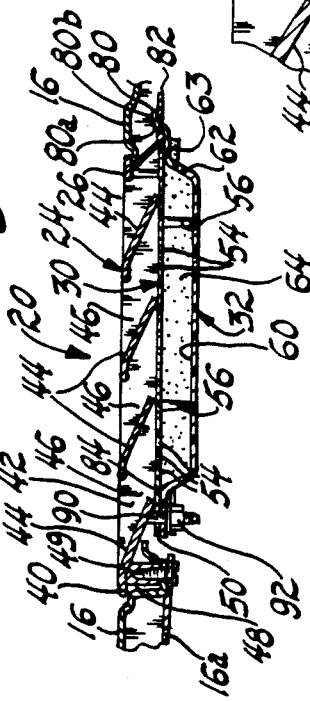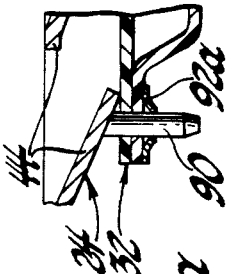

HOOD LOUVER DRAIN PAN AND SCREEN

The present invention relates to a vehicle hood air extractor assembly for extracting air from an engine compartment and, more particularly, to a one piece molded plastic screen and drain pan which can be readily secured to a hood louver.

Heretofore, hood mounted air extractor assemblies have been employed for extracting air from a vehicle engine compartment in order to prevent overheating the engine compartment. Air is extracted due to heat rise when the vehicle is stationary and extracted by being drawn out through the louver when the vehicle is moving as a result of ambient air flowing over the louver. These prior assemblies have included a decorative baffled hood louver overlying an opening in the hood, a screen located below the louver to keep foreign material out of the engine compartment and a drain pan located beneath the screen for collecting and draining away any water passing through the louver and screen. The separate screen and drain pans were assembled together and then connected to the underside of the louver or hood. While these assemblies have been satisfactory in operation, the screen and drain pan were made from separate metal parts which had to be assembled together and this fabrication allowed for variations in the air passage area between the drain pan and the louver and/or screen to take place so that different assemblies were not uniform.

In accordance with the provisions of the present invention, an air extractor assembly is provided in which the drain pan and screen are made of a one piece molded plastic material in which the screen and pan are located side by side in the as-molded condition and integrally connected to each other via living hinges at their adjacent side edges thereof. The screen and pan can be pivotally moved about the living hinges from their as-molded position to a connected position in which the drain pan is located beneath screen and with the drain pan engaging spacer pins, preferably integral with the screen and/or drain pan, to provide a predetermined peripheral air gap between the side walls of the pan and the screen through which engine compartment air can pass. Also, cooperable integrally formed fastener means on the drain pan and screen are provided to snap fittingly connect the screen and drain pan together so that both screen the and drain pan can be connected to the hood as a unit.

Another provision is to provide tabs on the drain pan which pass through openings in the louver to connect one side of the drain pan and screen to the louver and to provide aligned openings in the other side of the drain and screen to receive a threaded post on the louver and be clamped to the louver by a nut so that the screen and drain pan can be readily connected to and disconnected from the louver. Alternately, a suitable snap fastener could be employed.

Accordingly, an important object of the present invention is to provide a new and improved screen and drain pan for a hood mounted air extractor assembly which is of a simple and more economical construction than prior screen and drain pan assemblies and which provides a peripheral air gap of a predetermined area between the screen and pan so that uniformity is achieved when mass producing screen and drain pans.

Yet another object of the present invention is to provide a new and improved screen and drain pan for an air extractor assembly as defined in the next preceding object, and in which the drain pan and screen is of a one piece molded plastic construction in which the screen and drain pan are located side by side in the as-molded condition and integrally connected at adjacently located sides via living hinges so that the drain pan can be pivoted about the living hinges to a connected position directly beneath the screen and spaced therefrom by spacer pins integral with the screen so as to define a predetermined air gap between the screen and drain pan.

Yet another object of the present invention is to provide a new and improved screen and drain pan for an air extractor assembly, as defined in the next preceding object, and which includes cooperable means on the drain pan and screen at a location remote from the living hinges for snap fittingly connecting the drain pan and screen together when they are moved to their connected position.

Yet another object of the present invention is to provide a new and improved screen and drain pan for an air extractor assembly, as defined in the next preceding object, and which includes tabs on a side wall of the drain pan which are receivable through openings in the louver to connect one side of the drain pan and screen to the louver and a fastener means comprising spaced threaded posts on the louver which pass through aligned openings in the drain pan and screen and nuts threadably engaged with the posts for clamping the screen and drain pan to the louver whereby the drain pan and screen can be readily connected to and disconnected from the hood louver.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 3 is a fragmentary, enlarged cross sectional view taken along the lines 3—3 of FIG. 2;

FIG. 4 is a fragmentary, cross sectional view taken along the lines 4—4 of FIG. 2;

FIG. 4a is a fragmentary cross-sectional view like that shown in FIG. 4, but showing a different retainer;

FIG. 5 is a enlarged, fragmentary sectional view taken approximately along the lines 5—5 of FIG. 2;

Figure 1:
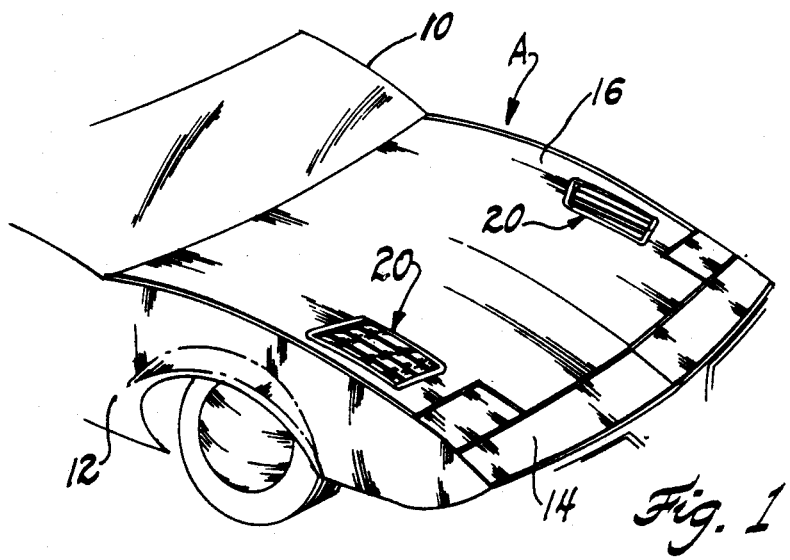
FIG. 1 is a fragmentary, front perspective view of an automotive vehicle embodying the novel air extractor assembly of the present inventions.

Referring to FIG. 1 of the drawings, an automotive vehicle A is thereshown. The vehicle A includes a windshield 10, side body structure 12, a front bumper and fascia 14 and a hood 16. The hood 16 overlies an engine compartment (not shown) in the vehicle A and is of the type which is adapted to be moved between open and closed positions in a manner well known to those skilled in the art.

In accordance with the provisions of the present invention, novel air extractor assemblies 20 are provided for extracting air from the engine compartment of the vehicle A to the exterior ambient atmosphere above the hood 16. The air extractor assemblies 20 are located adjacent the left and right sides of the hood, as viewed in FIG. 1, and are of an identical construction, and therefore only the left most air extractor assembly 20 will be described in detail.

The novel air extractor assembly 20 comprises a hood louver 24 which overlies a complementary shaped opening 26 (see FIG. 3) in the hood 16, a screen 30 located directly beneath the louver 24 and a drain pan 32 located directly beneath the screen 30.

Figure 2:
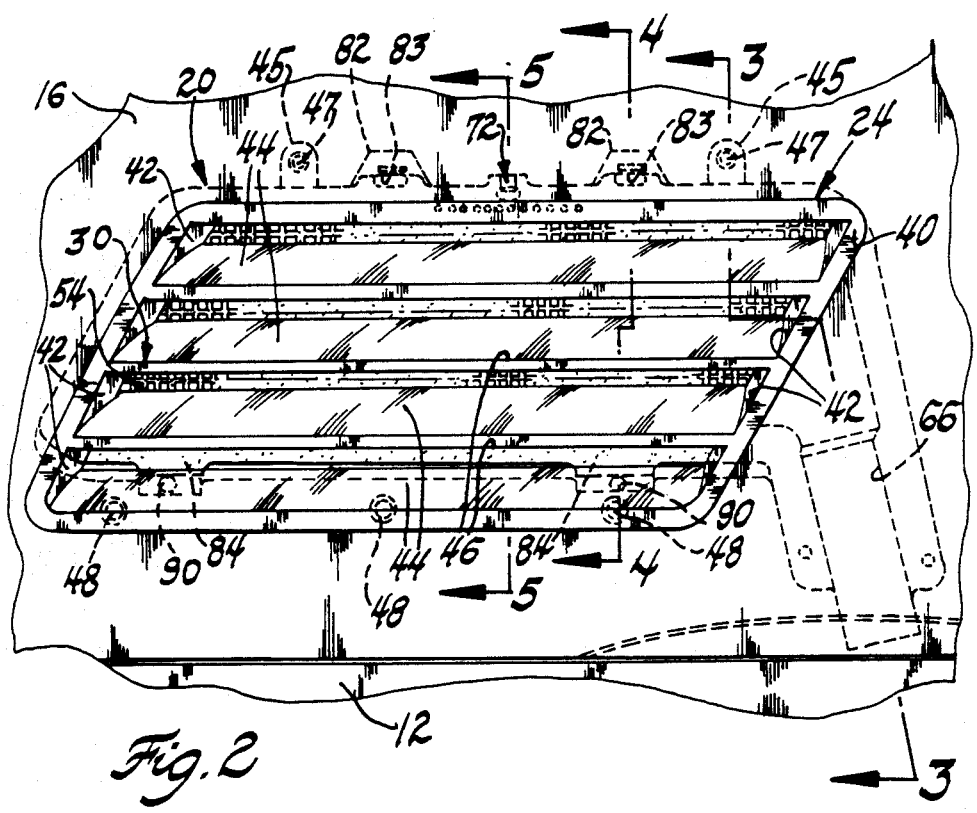
FIG. 2 is a fragmentary, enlarged top plan view of the air extractor assembly shown in FIG. 1.
Figure 7:
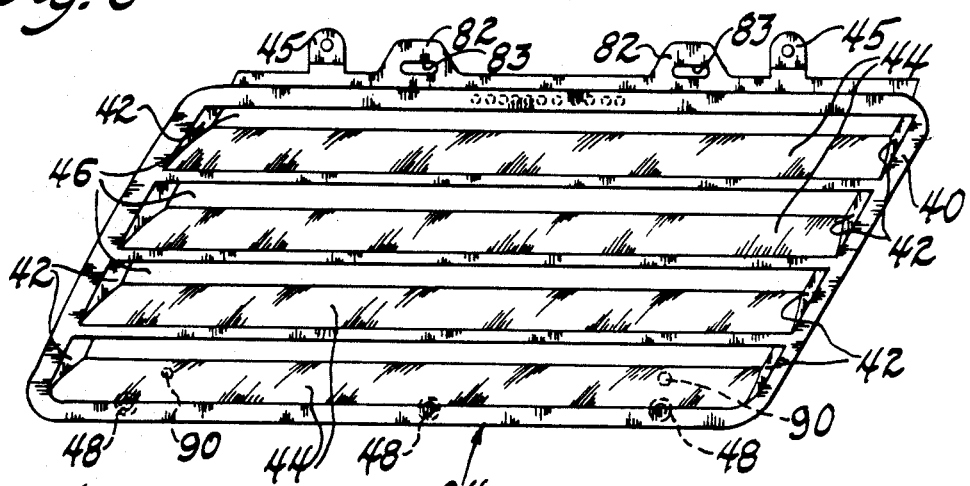
FIG. 7 is a plan view of the hood louver of the air extractor assembly of the present invention.

As best shown in FIGS. 2 and 7, the louver 24 comprises a decorative one piece zinc die cast louver having a generally parallelogram shape. It includes a peripheral flange 40 and side walls 42 extending generally perpendicular thereto. The side walls 42 are received within the opening 26 in the hood and with the flange 40 overlying the opening 26 in the hood 16. Integrally connected with the shorter two side walls 42 are a plurality of spaced curved baffles 44 extending laterally thereacross which define openings 46 therebetween through which air from the engine compartment can pass. The louver 40 also includes a pair of upper tabs 45, as viewed in FIG. 2, for engaging the underside of the inner hood panel 16a and which is connected to the inner hood panel 16a by suitable screws 47 passing through the inner hood panel 16a and threadably connected with threaded openings in the tabs 46 (see FIG. 3). The louver 24 at its lower end, as viewed in FIG. 2, includes a plurality of spaced, downwardly extending posts 48 (see FIG. 4) which rest against the inner panel 16a of the hood 16. The inner panel 16a is provided with aligned openings through which fasteners or screws 49 can pass and threadably engage with the internally threaded posts 48 to secure the louver 24 to the inner panel 16a.

Figure 6:
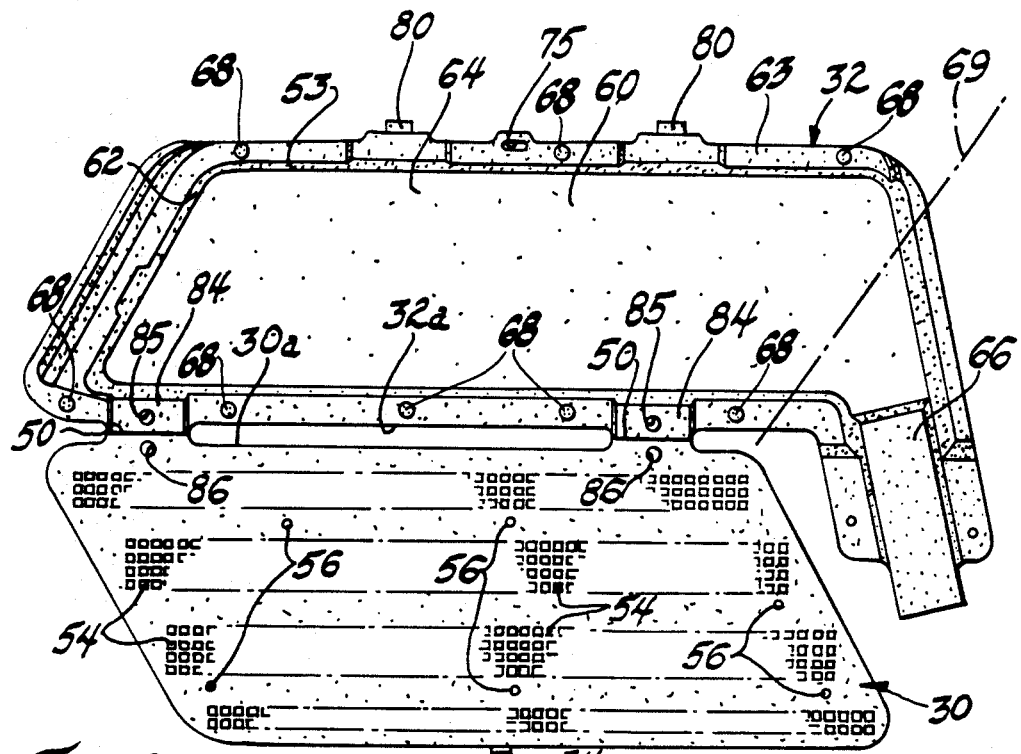
FIG. 6 is a plan view of the novel screen and drain pan of the air extractor assembly of the present invention and showing the same in its as-molded condition.

In accordance with the provisions of the present invention, a novel screen 30 and drain pan 32 are provided which are adapted to be readily connected to and disconnected from the hood louver 24. As best shown in FIG. 6, the drain pan 32 and the screen 30 are of a one piece molded plastic construction and when in the as-molded condition, as shown in FIG. 6, the screen 30 and drain pans 32 are located side by side. The screen 30 and drain pan 32 could be molded from any suitable or conventional heat resistant plastic material which is ultraviolet treated. The screen 30 and drain pan 32 at their adjacent sides 30a and 32a are slightly spaced from one another but integrally connected to each other via a pair of living hinges 50 at spaced longitudinal locations. The screen 30 and drain pan 32 have overall peripheral shapes which are shaped complementary with each other and which are shaped complementary with the metal louver 24. That is, the screen 30 has a generally parallelogram shape as does the drain pan 32. The screen 30 comprises a planar member having a multiplicity of apertures 54 therethrough and is provided with a plurality of spaced apart spacer pins 56 integrally molded therewith and extending perpendicular to its underside. The spacer pins 56 are of a predetermined length, and for a reason to be hereinafter more fully described.

The drain pan 32 has a planar bottom 60 and a peripheral side wall 62 which terminates in a planar peripheral end surface 63. The bottom 60 and side wall 62 define a pan having a top opening 64. As best shown in FIG. 6, the side wall 62 of the drain pans 32 at its right side defines a rectangular drain opening 66 for draining water from the bottom of the pan 32 toward a side fender rail of the vehicle. The drain pan 32 has a plurality of spaced apart integral pins 68 extending perpendicular to its end surface 63, and for a reason to be hereinafter more fully described.

As shown in FIG. 6, the left side wall portion 62 of the drain pan 32 and the left side of the screen 30 are angled in opposite directions in the as-molded condition. However, when the drain pans 32 and the screen 30 are pivoted about the living hinges 50 with the screen 30 being disposed directly over the drain pan end surface 63, 3, these left side edges will be in register with one another and with the right side of the screen 30, as shown in the phantom line 69 in FIG. 6, overlying the bottom 60 of the pan except for the drain opening 66. In the folded over position, the screen 30 will be directly in line or registry with the louver 24 when connected therewith.

The screen 30 and drain pan 32 are adapted to be pivotally moved about the living hinges 50 from their as-molded position, as shown in FIG. 6, toward a second or connected position, as shown in FIG. 3 in which the drain pan 32 is located directly beneath the screen 30. As the drain pan 32 and screen 30 are pivoted about the living hinges 50, the bottom surface 60 of the pan 32 will engage the spacer pins 56 on the screen and the pins 68 on the pan 32 will engage the screen 30 to position the drain pan 32 vis-a-vis the screen 30 so as to control and maintain the screen height with respect to the mating surface and define a peripherally extending air gap 70 between the upper end 63 of the side walls 62 and the screen 30.

The drain pans 32 when pivoted to its connected position is held in its connected position by cooperable, snap-fitting fastener means 72 on the drain pan 32 and screen 30. To this end, the screen 30 is provided with a downwardly extending barbed tab 74 whose end terminates in a barb 74a and the drain pan 32 at its side wall 62 remote from the living hinge 50 is provided with an aperture 75 through which the tab 74 may be received. As the drain pan 32 is being connected to the screen 30, the end 63 of the side wall 62 will engage the tapered surface of the barb 74a and the tab 74 will be deflected toward the left, as viewed in FIG. 5, until the barbed end 74a clears and passes through the opening 75 in the end 63 of the drain pan 32 whereupon the deflectable tab 74 due to its self biasing forces will return toward its normal free state position and be positioned or catch the underside of the end 63 of the side wall 62 to snap fittingly connect the drain pan to the screen 30. The drain pan 32 can be disconnected from the screen 30 by pushing the tab 74 to the left and pulling down on the pan 32.

The screen 30 and drain pan 32, when connected are adapted to also be readily connected to the hood louver 24. To this end, the upper end 63 of the drain pan 32 at a pair of spaced locations is provided with outwardly projecting tabs 80 which have both a vertically and horizontally disposed portions 80a and 80b. The hood louver 24 includes a pair of tabs 82 extending laterally outwardly from its side edge and which are provided with slotted openings 83 therethrough. In addition, the drain pan 32 at its side adjacent the living hinges 50 are provided with raised bosses 84 having through openings 85 and the screen 30 is provided with a pair of through openings 86 adjacent the living hinges 50. The living hinges 50 extend along the top outer edge of the bosses 84 to pivotally connect the screen 30 to the drain pan 32. When the drain pan 32 and screen 30 are connected together, as best shown in FIG. 4, the openings 85 and 86 are aligned so that a threaded, integrally formed fastener or post 90 on the hood louver 24 can be passed therethrough.

The screen 30 and drain pan 32 are connected to the hood louver 24 by first inserting the tabs 80 in th openings 83 in the hood louver 24 and swinging the screen 30 and drain pan 32 upwardly so that the horizontal portion 80*b* of the tabs 80 overlie the flanges 82 on the hood louver 24 so that the opposite side receives the threaded integrally formed posts 90 on the hood louver 24, the posts 90 passing through the aligned openings 85 and 86 in the end 63 of the drain pan 32 and screen 30. The drain pan 32 and screen 30 are clamped to the posts 90 on the hood louver 24 by suitable nuts 92 threadably engaged with the posts 90. Alternately a push on or push on snap retainer 92*a* which is slidable over the post 90 could be employed, as shown in FIG. 4a. It will thus be apparent that by removing the nuts 92 the screen 30 and drain pan 32 are disconnected at their left side from the hood louver 24 and then the right side can be disconnected by moving the screen and drain pan so that the tabs 80 are removed from the openings 82.

In operation, when the hood louver and drain pan assembly 20 are all connected together, air from the engine compartment can pass through the peripheral gap 70 into the pan 32 and then through the apertures 54 in the screen 30 and then through the passages 46 in the hood louver 24. If the vehicle is stationary, hot air from the engine compartment can merely rise up through the hood louver. If the vehicle is moving, air passing across the hood 16 of the vehicle A will flow across the baffles 44 and create a negative pressure zone at the baffles 44 which draws hot air from the engine compartment through the peripheral gap 70 into the pan 32, then through the apertures 54 in the screen 30 and out through the passages 46 between the baffles 44 to be mixed with the air passing over the hood.

From the foregoing, it should be readily apparent that a novel screen 30 and drain pan 32 has been provided which is of a relatively simple and economical construction. It should also be readily apparent that the screen and drain pan are made from a one piece molded plastic construction and can be readily pivoted about a living hinge connecting the drain pan and screen together to a connected position in which the drain pan engages spacer pins extending downwardly from the screen so as to properly position the drain pan relative to the screen and thus provide a predetermined or controlled air gap between the upper end of the side walls of the drain pan and the screen through which engine compartment air can pass. It should also be readily apparent that a novel quick connect cooperable fastener means has been provided to connect the drain pan to the screen and that the drain pan and screen subassembly can then be readily connected to and disconnected from the hood louver.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In an automotive vehicle having a hood for covering an engine compartment and which is provided with an opening therethrough and an air extractor assembly carried by the hood and through which air from the engine compartment is extracted, said air extractor assembly comprising a louver overlying said opening and having spaced baffles through which the air can pass, a screen disposed in said opening and located beneath the baffles and a drain pan disposed beneath the screen for collecting and draining water, the improvement being that said screen and drain pan are of a one piece molded plastic construction, are located side-by-side in the as-molded condition and integrally connected together via living hinge means, said screen being planar and having a multiplicity of apertures therethrough, said pan having a bottom, side walls and a drain opening, said drain pan and screen being pivotally movable about said living hinge means from their as-molded position to a second position in which the drain pan is located beneath said screen, one of said screen and drain pan having a plurality of spacers integrally molded therewith and extending transversely thereof which are engageable with the other of said drain pan and screen when the screen and drain pan are in their second position to define a peripherally extending gap between the screen and the side walls of the drain pan through which air can pass, cooperable means on said drain pan and screen at a location remote from said living hinge means for snap fittingly connecting said drain pan and screen together when they moved to their second position, and means for connecting said drain pan and screen to said louver.

2. In an automotive vehicle having a hood for covering an engine compartment and which is provided with an opening therethrough and an air extractor assembly carried by said hood and through which air from the engine compartment is extracted, said extractor assembly comprising a louver having a plurality of spaced baffles overlying said opening through which air can pass, a screen disposed beneath said louver and a drain pan disposed beneath said screen for collecting and draining away water passing through said louver and screen, the improvement being that said screen and drain pan are of a one piece molded plastic construction and located side-by-side in their as-molded condition and integrally connected together at their adjacent sides via living hinges, said screen being planar and having a multiplicity of apertures therethrough, said pan having a bottom and side walls defining an open end and a drain opening, said drain pan and screen being pivotally movable about said living hinges from their as-molded position to a second position in which the open end of the drain pan is positioned beneath the screen, said screen having a plurality of spaced spacer pins integrally molded therewith and extending substantially perpendicular thereto which are engaged by the bottom of said pan when the screen and pan are in their second position to space the drain pan from the screen so that a peripherally extending gap is defined between the side walls of the drain pan and the screen through which air can pass, cooperable means on said drain pan and screen at a location remote from said living hinges for snap fittingly connecting said drain pan and screen together when they are moved to their second position, and means for connecting said drain pan and screen to said louver.

3. In an automotive vehicle having a hood for covering an engine compartment and which is provided with an opening therethrough and an air extractor assembly carried by said hood and through which air from the engine compartment is extracted, said extractor assembly comprising a louver having a plurality of spaced baffles overlying said opening through which air can pass, a screen disposed beneath said louver and a drain pan disposed beneath said screen for collecting and draining away water passing through said louver and screen, the improvement being that said screen and drain pan are of a one piece molded plastic construction and located side-by-side in their as-molded condition and integrally connected together, at their adjacent sides via living hinges, said screen being planar and having a multiplicity of apertures therethrough, said pan having a bottom and side walls defining an open end and a drain opening, said drain pan and screen being pivotally movable about said living hinges from their as-molded position to a second position in which the open end of the drain pan is positioned beneath the screen, said screen having a plurality of spaced spacer pins integrally molded therewith and extending substantially perpendicular thereto which are engaged by the bottom of said pan when the screen and pan are in their second position to space the drain pan from the screen so that a peripherally extending gap is defined between the side walls of the drain pan and the screen through which air can pass, cooperable means on said drain pan and screen at a location remote from said living hinges for snap fittingly connecting said drain pan and screen together when they are moved to their second position, tabs on a side wall of said drain pan which are receivable through openings in said louver to connect one side of said drain pan to said louver, first fastener means for connecting the other side of said drain pan and screen to said louver, said tabs and said first fastener means enabling said drain pan and screen to be connected to and disconnected from said louver without disconnecting said louver from said hood, and second fastener means for connecting said louver of said air extractor assembly to said hood.

4. In an automotive vehicle, as defined in claim 3, and wherein said louver is made from a zinc die cast material and said first fastener means comprises spaced, threaded posts integral with said louver on its underside which extends through aligned openings in said other side of said screen and drain pan and nuts threadably engaged with said posts for clamping said screen and drain pan to said louver.

5. In an automotive vehicle, as defined in claim 3, wherein said cooperable means on said drain pan and screen comprises an integral deflectable downwardly extending barbed tab on said screen which is snap fittingly received through an opening in said drain pan and engageable with the underside of said drain pan to hold the drain pan and screen in their second position.

* * * * *